Figure 1:
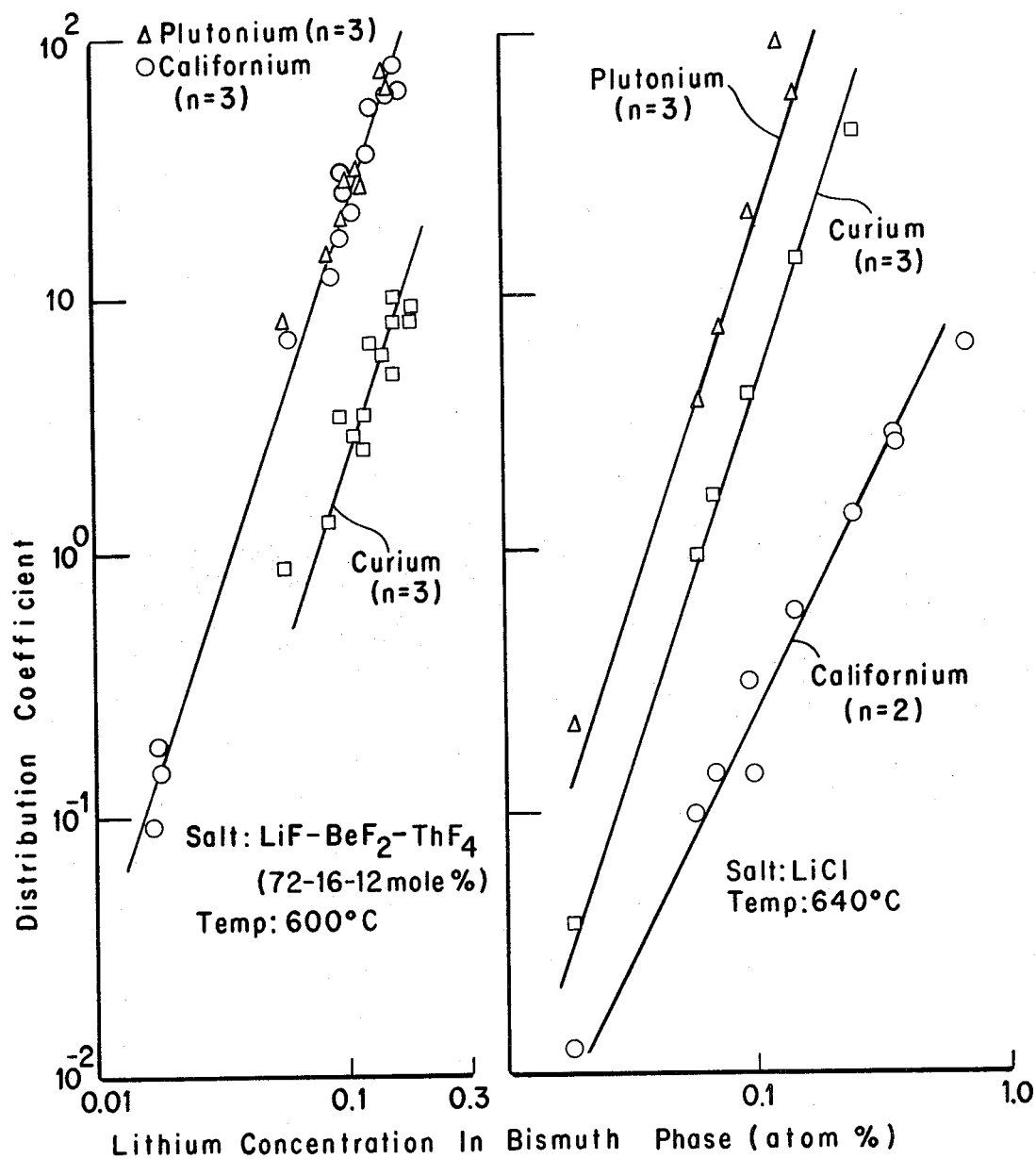

United States Patent [19]

Mailen et al.

[11] 3,761,564

[45] Sept. 25, 1973

[54] SEPARATION OF CALIFORNIUM FROM OTHER ACTINIDES

[75] Inventors: James C. Mailen, Oak Ridge; Leslie M. Ferris, Knoxville, both of Tenn.

[73] Assignee: The United States of America as represented by the United States Atomic Energy Commission, Washington, D.C.

[22] Filed: Jan. 24, 1972

[21] Appl. No.: 220,076

[52] U.S. Cl............................ 423/5, 423/3, 423/8, 423/250, 252/301.1 R
[51] Int. Cl............................................ C01g 56/00
[58] Field of Search .................. 423/3, 5, 8, 250; 252/301.1 R

[56] References Cited
UNITED STATES PATENTS

| | | | |
|---|---|---|---|
| 3,577,225 | 5/1971 | Shaffer et al. | 423/8 |
| 2,840,464 | 6/1958 | Wiswall | 423/5 |

OTHER PUBLICATIONS

Bareis et al., Nucleonics, Vol. 12, No. 7, pp. 16-19, (1954).

*Primary Examiner*—Carl D. Quarforth
*Assistant Examiner*—F. M. Gittes
*Attorney*—Roland A. Anderson

[57] ABSTRACT

A method is provided for separating californium from a fused fluoride composition containing californium and at least one element selected from the group consisting of plutonium, americium, curium, uranium, thorium, and protactinium which comprises contacting said fluoride composition with a liquid bismuth phase containing sufficient lithium or thorium to effect transfer of said actinides to the bismuth phase and then contacting the liquid bismuth phase with molten LiCl to effect selective transfer of californium to the chloride phase.

3 Claims, 2 Drawing Figures

SEPARATION OF CALIFORNIUM FROM OTHER ACTINIDES

BACKGROUND OF THE INVENTION

The invention described herein was made in the course of, or under, a contract with the U.S. Atomic Energy Commission.

The present invention relates to a metal transfer process between a molten bismuth phase to a molten chloride phase. More particularly, it relates to a method for separating californium from a molten chloride or fluoride salt or liquid bismuth containing a mixture of lanthanide and actinide elements, particularly transplutonium elements.

A purified form of californium is of practical value for at least two reasons. Californium—252 serves as a highly intense neutron source emitting $2 \times 10^{12}$ neutrons per second per gram of material. It may also serve as a target for further neutron irradiation to produce, by nuclear transmutation, such elements as einsteinium, fermium, mendelevium, and nobelium.

There are at least two molten halide solutions which could be used as a feed from which californium might be separated. One such solution is derived from a californium-containing target which is dissolved in a molten salt such as $2LiF-BeF_2$. Another is a spent molten fluoride reactor fuel solution containing a mixture of lanthanide and actinide elements.

In copending application Ser. No. 45,089, filed June 10, 1970, we disclosed a metal transfer method for separating actinides from a molten fluoride solution containing rare earth elements (i.e., those having atomic numbers in the range 57–62) and actinides such as uranium, plutonium, and americium by selective extraction into a liquid bismuth phase containing a reducing concentration of lithium or thorium. Assuming sufficient metal reductant in the liquid bismuth phase, the actinides are selectively reduced to their elemental form and are transferred to the bismuth phase. Separation of curium from the other actinides can then occur by contacting the actinide-laden liquid bismuth phase with a molten fluoride salt to selectively extract curium into the salt phase. In effect, we found that the distribution coefficients of actinides, defined as the concentration of a selected actinide in the liquid bismuth phase divided by its concentration in the molten fluoride phase, are sufficiently different to allow separation of curium from other actinides, but not sufficiently different to allow isolation of californium.

SUMMARY OF THE INVENTION

The present invention in its principal aspect is predicated on the discovery that the distribution coefficient of californium in a molten chloride system is sufficiently different from other actinides such as plutonium, curium, americium, uranium, thorium, and protactinium to allow clean-cut separation of californium.

At a given temperature, the distribution of an element $M$ between a molten LiCl phase and a liquid bismuth phase containing a reducing (sufficient to reduce $MCl_n$ to $M$) concentration of lithium can be expressed in simplified form as $$D_M = (X_{Li})^n (K^*_M),$$

or in logarithmic form as $$\log D_M = n \log X_{Li} + \log K^*_M,$$

where:
$D_M$ = the distribution coefficient of metal $M$ between molten LiCl and a liquid bismuth phase;
$X_{Li}$ 32 the mole fraction of Li in the bismuth phase;
$n$ = the valence of the element in the salt phase; and
$\log K^*$ = a constant at a given temperature.

Thus, a plot of $\log D_M$ vs. $\log X_{Li}$ should give a straight line having a slope, $n$, that is equal to the oxidation state of the component $M$ in the salt phase. Using the same equation, it can also be shown that distribution coefficients for any two elements at corresponding values of $X_{Li}$ will, in a plot of $\log D_1$ vs. $\log D_2$, yield a line having a slope having a value of $n_1/n_2$, where $n_1$ and $n_2$ are the valence states of the elements concerned. Similar equations can be developed for a fluoride phase in contact with a liquid bismuth phase.

In conducting experiments designed to develop distribution coefficient data, we determined the oxidation states of the elements involved. We found that the californium exhibits an oxidation state of +2 in a chloride system and can be separated from sister transplutonium elements which are in the +3 oxidation state. This behavior is entirely anomalous and unpredictable, since the known chemical behavior of the actinides provides no basis for expecting that the oxidation state of californium would be different in a molten chloride phase as opposed to a molten fluoride phase.

In the ensuing description there is provided a representative embodiment which illustrates how the data were developed to support the claimed invention. In the several examples, all distribution data were collected at a temperature of 640°C. It should be understood, however, that the invention is not limited to any particular temperature beyond the obvious fact that it must be in excess of the liquidus of the molten salt phase and not so high as to vaporize any californium. Operable temperatures are in the range 625°C. to 900°C.

The bismuth, lithium metal, and LiCl used were reagent grade. The $^{239}Pu$ (which contained about 0.1% $^{241}Am$) was available in metallic form. The $^{244}Cm$ and $^{252}Cf$ were obtained in 1 N HCl solutions from the Transuranium Research Facility of the Oak Ridge National Laboratory. The gaseous hydrogen chloride was Matheson electronic grade and was used as received. The hydrogen was Matheson ultrapure grade and was further treated by passage through a catalytic oxidizer and a Molecular Sieve trap. Argon, which was used to provide an inert atmosphere, was purified by successive passage through two traps packed with uranium turnings. The first trap was held at 600°C. for removal of oxygen and water vapor, and the second was held at about 200°C. for removal of hydrogen. The reductant used in the experiment was a lithium-bismuth alloy containing about 15 atom percent lithium. This alloy was prepared from the pure metals.

Equilibrations were conducted in an argon atmosphere in vessels fabricated from 2-in.-OD nickel-plated mild steel pipe. The bismuth and salt phases were contained in a molybdenum crucible that was placed inside the vessel. By use of a ball-valve and Teflon plug arrangement, samples could be removed from the system without opening the vessel to the atmosphere. The filter-type samplers were fabricated of stainless steel. The temperature of the system was measured just below the salt-metal interface with a calibrated Chromel-Alumel thermocouple.

Initially, 200 g of bismuth and 75 g of oven-dried LiCl were loaded into a molybdenum crucible, and 1 N HCl solutions containing about 0.1 mg of $^{244}$Cm and 0.1 μg of $^{252}$Cf were pipetted onto the LiCl. After the loaded crucible had been inserted in the reaction vessel, it was heated to about 200°C. to drive off any water. The vessel was then flushed with argon, 850 mg of plutonium metal was added, and the vessel was sealed to make the system gastight. The system was then heated to 640°C. under an argon atmosphere and a molybdenum sparge tube was inserted. Finally, the two-phase system was sparged at 640°C. for 48 hours with HCl-H$_2$ (50-50 mole percent) to remove residual oxygen and to dissolve the various components in the salt phase as their respective chlorides. After the hydrochlorination, the system was flushed with argon and then left under a static argon pressure of about 5 psig.

The various elements were extracted incrementally from the salt phase into the bismuth phase by periodically adding weighed amounts of reductant in the form of lithium-bismuth alloy to the system. After each addition of alloy, a period of at least 4 hours was allowed for the attainment of equilibrium before samples of each phase were taken.

Each sample of the bismuth phase was dissolved in concentrated nitric acid, and each sample of the salt phase was dissolved in 1 N HCl. Aliquots of the resulting solutions were used for the various analyses. Lithium was determined by a flame-photometric method, whereas $^{239}$Pu and $^{244}$Cm were determined by alpha-pulse height analysis. Counting of the fast neutrons emitted in the spontaneous fission of $^{252}$Cf provided analyses for this isotope. Gamma spectrometry was used to determine $^{241}$Am.

The distribution coefficient data obtained at 640°C. in this experiment are given in the table below.

TABLE

Distribution Coefficients Obtained at 640°C.

| $10^4 X_{Li}$ | $D_{Pu}$ | $D_{Cm}$ | $D_{Cf}$ | $D_{Am}$ |
|---|---|---|---|---|
| 1.65 | 0.132 | 0.0278 | 0.00895 | 0.097 |
| 2.70 | 0.675 | 0.121 | 0.0234 | 0.358 |
| 2.82 | 0.772 | 0.174 | 0.0258 | 0.437 |
| 2.97 | 0.620 | 0.124 | 0.0216 | 0.351 |
| 3.69 | 2.29 | 0.409 | 0.0506 | 1.15 |
| 5.70 | 1.50 | 0.256 | 0.0428 | 0.893 |
| 10.8 | 94.4 | 7.98 | | |
| 16.2 | 23.8 | 4.04 | 0.291 | |
| 22.8 | 82.8 | | | |

The data show that each of these elements can be effectively separated from the other in a molten lithium chloride system in contact with a liquid bismuth system containing lithium. The same general result can be effected using thorium as the reductant.

Plots of log $D_M$ vs. log $X_{Li}$, using the distribution coefficients for plutonium, curium, and californium, are shown in FIG. 1. The lines shown were drawn with slopes of 3, 3, and 2 for plutonium, curium, and californium, respectively. For purposes of comparison, FIG. 1 shows plots of log $D_M$ vs. log $X_{Li}$ in a fluoride system from which it is seen that californium is in the +3 oxidation state and has a distribution coefficient too close to plutonium to permit efficient separation.

Figure 2:
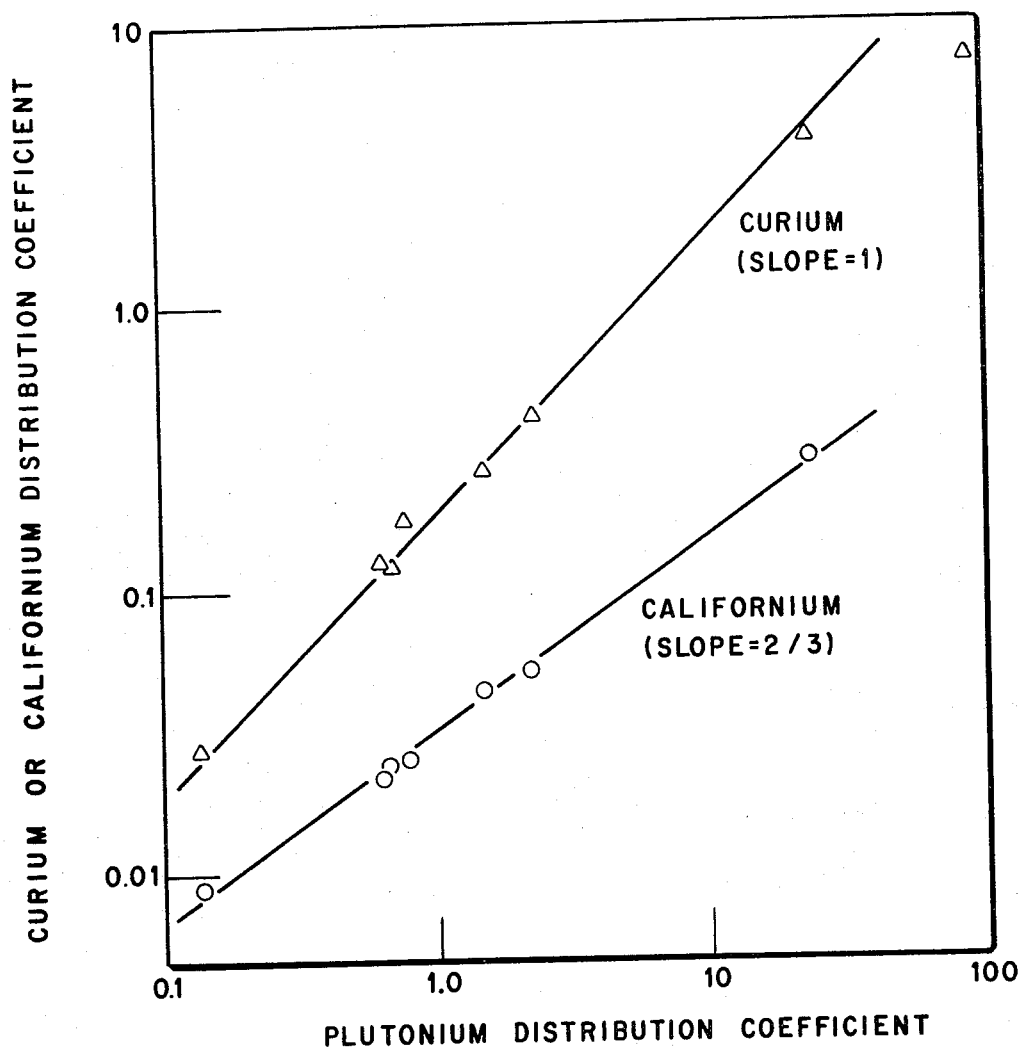

FIG. 1 is also presented to illustrate that californium was in a lower oxidation state than plutonium and curium in the chloride system. Assuming that $n = 3$ for plutonium and, since a plot of $D_{Cm}$ vs. log $D_{Pu}$, as shown in FIG. 2, gave a line of slope 1, it is clear that plutonium and curium both were present in the salt phase in the +3 oxidation state. Thus, the slope of 2/3 obtained from the plot of log $D_{Cf}$ vs. log $D_{Pu}$ (FIG. 2) indicates that most of the californium in the cloride salt is in the +2 oxidation state. This conclusion is consistent with the indication from the plots of log $D_M$ vs. log $X_{Li}$ (FIG. 1). Data for $^{241}$Am, although not shown graphically, indicate that most of the americium was in the +3 oxidation state in the salt phase.

It will thus be seen that we have demonstrated a method which allows clean-cut separation of californium from such chemically related actinides as curium, plutonium, and americium. The invention is simply practiced by contacting a liquid bismuth phase with molten LiCl at a temperature in the range in excess of the liquidus of the molten chloride phase and preferably at a temperature in the range 625°C. to 900°C. Data obtained at intermediate temperatures show that the distribution coefficients are not markedly affected by temperature.

A principal area of utility of the present invention lies in the processing of spent reactor molten fluoride fuel compositions for use in molten salt reactors of the kind under study and construction at the Oak Ridge National Laboratory, Oak Ridge, Tennessee. A spent fuel will contain mixtures of actinide elements and rare earth elements, those having an atomic number in the range 57-62 as well as those elements which react in an equivalent manner such as yttrium and barium. Where this invention is applied to such compositions, it will be found that at equilibrium, with the fluoride and chloride phases in mutual contact with the liquid bismuth phase containing the desired reductant, the divalent rare earths, europium and samarium, will follow the californium into the lithium chloride phase. The californium can be effectively separated from the divalent rare earths by separating the lithium chloride phase and then contacting it with a liquid bismuth phase containing an appropriate reducing concentration of lithium or thorium to cause selective transfer of californium to the liquid bismuth phase. And, while we have described a process of using a lithium chloride phase to effect selective transfer of the actinides, it is within the scope of our inventive concept to utilize a lithium bromide-containing phase to obtain equivalent results.

What is claimed is:

1. A method for separating californium from a spent molten fluoride reactor fuel composition containing californium and at least one actinide element selected from the group consisting of plutonium, americium, curium, uranium, thorium, and protactinium, as their respective fluorides, which comprises contacting said fluoride composition with a liquid bismuth phase containing sufficient lithium or thorium to effect transfer of said actinides to the bismuth phase and then contacting the liquid bismuth phase with molten LiCl to effect selective transfer of californium to the chloride phase.

2. The method according to claim 1 wherein the transfer of californium to the chloride phase is effected at a temperature in the range 625°–900°C.

3. The method according to claim 1 wherein the californium-containing LiCl phase is contacted with a liquid bismuth phase containing sufficient Li or Th to effect selective transfer of californium to the bismuth phase.

* * * * *